United States Patent [19]
Moore

[11] 3,806,929
[45] Apr. 23, 1974

[54] METHOD FOR THE DETECTION OF RADAR TARGETS

[75] Inventor: Robert P. Moore, Riverside, Calif.

[73] Assignee: The United States of America as represented by the Secretary of the Navy, Washington, D.C.

[22] Filed: June 24, 1971

[21] Appl. No.: 160,073

[52] U.S. Cl................ 343/5 SA, 324/77 R, 343/7.7
[51] Int. Cl........................... G01s 9/42, G01r 23/16
[58] Field of Search....... 343/7.7, 5 SA, 18 E, 5 DP; 324/77 G, 77 H, 77 R

[56] References Cited
UNITED STATES PATENTS

| | | | |
|---|---|---|---|
| 3,631,339 | 12/1971 | Low.................................. | 324/77 G |
| 3,167,738 | 1/1965 | Westerfield....................... | 324/77 H |
| 3,594,800 | 7/1971 | Stoney.............................. | 343/7.7 |
| 3,603,996 | 9/1971 | Murchison........................ | 343/7.7 |
| 3,614,784 | 10/1971 | Richmond......................... | 343/7.7 |
| 3,408,647 | 10/1968 | Dynan et al. .................... | 343/7.7 |
| 3,431,405 | 3/1969 | Dawson............................ | 343/5 SA |

Primary Examiner—Maynard R. Wilbur
Assistant Examiner—G. E. Montone
Attorney, Agent, or Firm—R. S. Sciascia; G. J. Rubens; T. M. Phillips

[57] ABSTRACT

Method and apparatus for detecting targets in high sea states and sea clutter. A comparison is made of a stored representation of doppler spectrums from sea returns free of targets with instantaneous statistics of sea clutter doppler to determine the presence of a target. Radar return pulses are fed through range gates and filters to produce a spectrum of signals corresponding to distributed ranges from the radar. The spectrum of signals is compared with the stored doppler spectrum in a variance analyzer to produce an output when a target signal is present.

1 Claim, 7 Drawing Figures

|   | A | B | C | D | TOTAL | MEAN |
|---|---|---|---|---|---|---|
| FREQUENCY A | $X_{11}$ | $X_{21}$ | $X_{31}$ | $X_{41}$ | $T_{+1}$ | $\bar{X}_{.1}$ |
| FREQUENCY B | $X_{12}$ | $X_{22}$ | $X_{32}$ | $X_{42}$ | $T_{+2}$ | $\bar{X}_{.2}$ |
| FREQUENCY C | $X_{13}$ | $X_{23}$ | $X_{33}$ | $X_{43}$ | $T_{+3}$ | $\bar{X}_{.3}$ |
| TOTAL | $T_{1+}$ | $T_{2+}$ | $T_{3+}$ | $T_{4+}$ | $T_{++}$ | |
| MEAN | $\bar{X}_{1.}$ | $\bar{X}_{2.}$ | $\bar{X}_{3.}$ | $\bar{X}_{4.}$ | | $\bar{X}_{..}$ |

FIG. 2A

|   | SUM OF SQUARES | df | MEAN SQUARE | ESTIMATE OF |
|---|---|---|---|---|
| COLUMN MEANS | $\sum \frac{T_{i+}^2}{r} - \frac{T_{++}^2}{rc} = S_c$ | $c-1$ | $\frac{S_c}{(c-1)}$ | $\sigma^2 + r\sigma_c^2$ |
| ROW MEANS | $\sum \frac{T_{+j}^2}{c} - \frac{T_{++}^2}{rc} = S_r$ | $r-1$ | $\frac{S_r}{(r-1)}$ | $\sigma^2 + c\sigma_r^2$ |
| REMAINDER | $S_T - S_c - S_r = S_R$ | $(c-1)(r-1)$ | $\frac{S_R}{(c-1)(r-1)}$ | $\sigma^2$ |
| TOTAL | $\sum\sum X_{ij}^2 - \frac{T_{++}^2}{rc} = S_T$ | $rc-1$ | | |

FIG. 2B

INVENTOR.
ROBERT P. MOORE

INVENTOR.
ROBERT P. MOORE

METHOD FOR THE DETECTION OF RADAR TARGETS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method and means for the detection of radar targets in the presence of high sea state when sea clutter makes detection impossible with conventional radars. There exists a need for a reliable method and means for detecting small to moderate size ships which represent a potential missile threat in naval warfare. Conventional pulsed radars cannot reliably perform this function because sea return from waves is very similar to target returns and obscures the target signal. Many techniques have been employed to improve discrimination, including separation of the target doppler, frequency diversity, and analysis of the time variation of the signal return. None of these techniques have met with success.

SUMMARY OF THE INVENTION

The present invention conceives a method and apparatus which will detect a target in the presence of high sea state and sea clutter by detecting the change in the doppler spectrum of the sea with the presence of a target. Reflected signals representing a sampling on a spatial basis over the sea surface are gated and fed into a filter bank to produce a doppler spectrum which is the discriminatable signal. The doppler spectrum signals are processed to obtain instantaneous statistics of the sea clutter in the form of a sampling distribution. The statistics are then tested for the presence of a target.

OBJECTS OF THE INVENTION

It is an object of the present invention to provide an improved method and apparatus for the detecting of targets in the presence of high sea state and sea clutter.

Another object of the invention is the provision of an improved method and apparatus for the detection of targets in the presence of high sea state and sea clutter by comparing instantaneous statistics of the sea clutter with a doppler spectrum of the sea return signals.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 2A is a data table based on three frequency intervals and four range gates;

FIG. 2B is an analysis of variance table based on the data of the table of 2A;

DESCRIPTION OF THE PREFERRED EMBODIMENTS

Figures 1, 6:
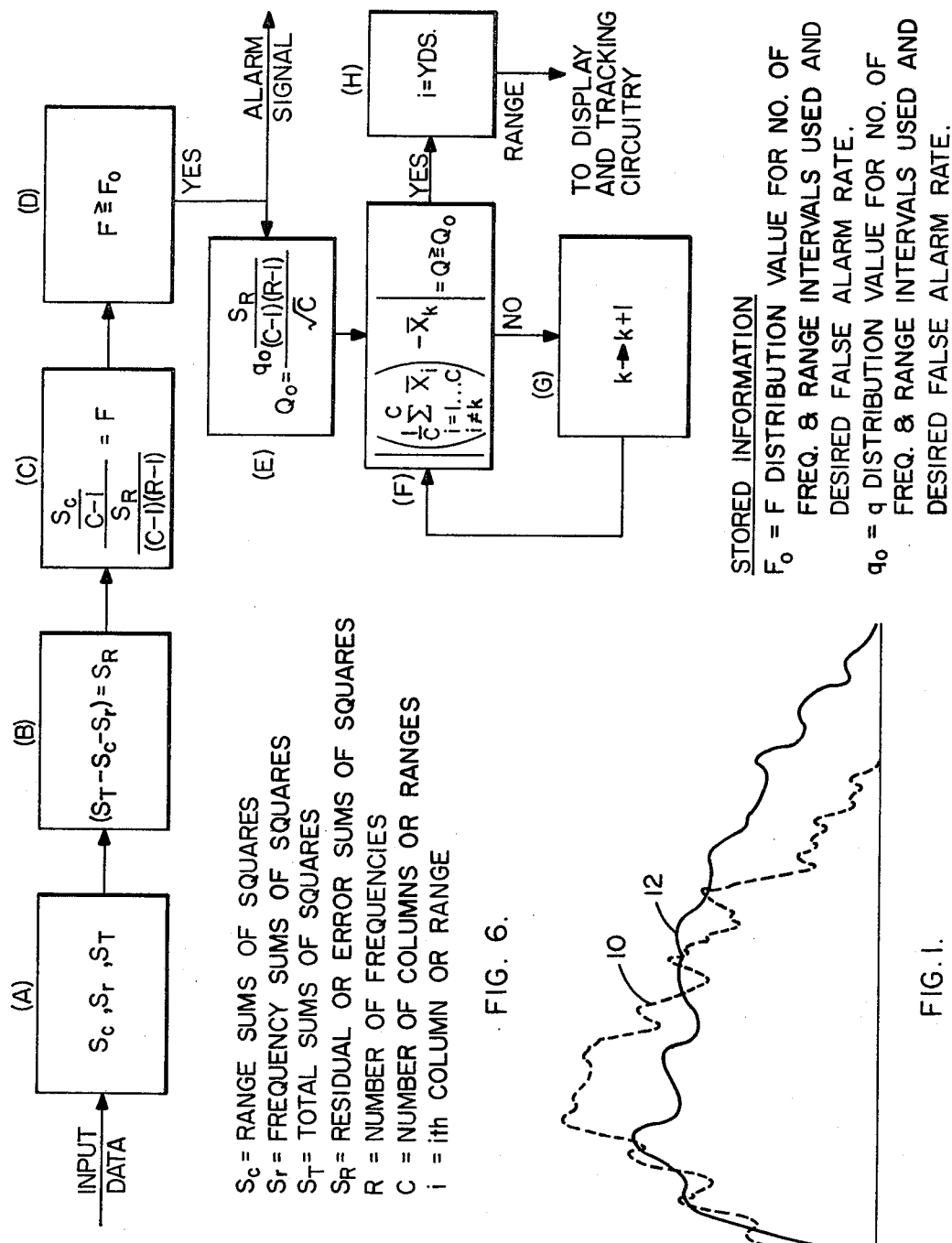
FIG. 1 is a graph of sea clutter spectrum.
FIG. 6 is a flow diagram of the program for the computer shown in FIGS. 4 and 5.

Referring now to the drawings there is shown in FIG. 1 representations of doppler spectrums from sea returns. Waveform 10 is sea clutter alone and waveform 12 is sea clutter plus a moving target. As can be seen the relative energy distribution for various velocities differ. These differences arise from at least two sources, the ship or target itself and the ship wake, particularly the turbulent wake in the immediate vicinity of the ship. These turbulences replace the natural sea surface scatters, whose velocities as well as cross section is different. A stationary ship will have the same effect, except that the turbulent wake will be absent.

Figure 3:
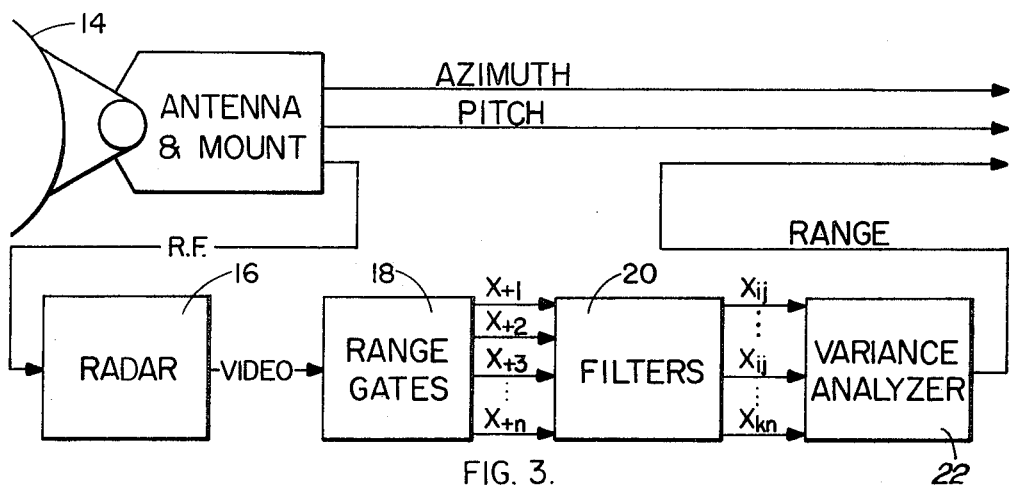
FIG. 3 is a block diagram of a preferred embodiment of the invention.

Referring to FIG. 3, a block diagram is shown of a detection circuit in accordance with this invention. A conventional antenna 14 receives echo signals from the sea surface of interest. Signals received by antenna 14 are fed to a pulse doppler receiver 16 for processing. The video output signal from receiver 16 consists of a pulse return which has been superheterodyned in a coherent manner to audio frequencies. Range gates 18 are opened sequentially in the conventional manner after transmission of a pulse at times corresponding to the times it takes the pulsed energy to make a round trip from the radar to various ranges. Thus the output of range gate 18 consists of video signals from different areas of the ocean distributed in range from the radar. The gated signals from gates 18 are fed to a filter bank 20. The filters of filter bank 20 may be reed or electronic filters with one set of filters for each range gate. The set for each range gate covers from zero to the frequency of the highest significant velocity expected to be observed.

The outputs from filter bank 20 correspond to a set of signals composing a doppler spectrum (one output for each frequency for each range gate). The output signals from filter bank 20 are fed to variance analyzer 22.

Figure 4:
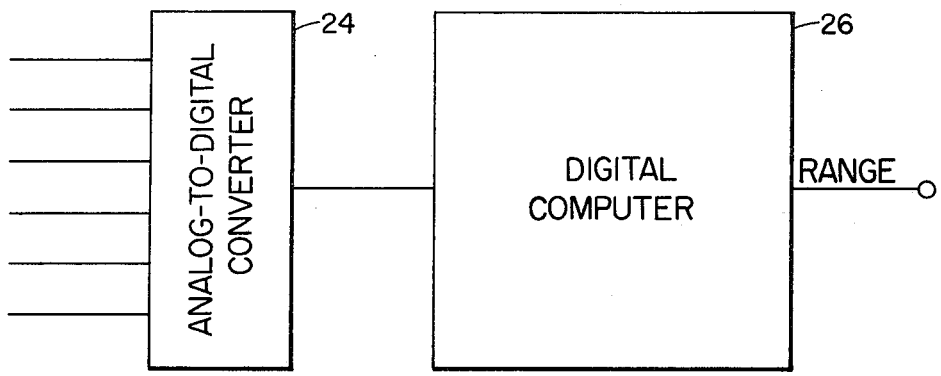
FIGS. 4 and 5 are block diagrams of the analyzer of FIG. 3.

Variance analyzer 22 may consist of two devices as shown in FIG. 4, an analog-to-digital converter 24 and a digital computer 26. Analog-to-digital converter 24 should have provision for multiple inputs, and a means for scanning these inputs in sequence and transmitting them to digital computer 26. Such converters and computers are of conventional design and are well known in the art. Digital computer 26 should be capable of performing multiplication, division and simple logic operation and should have a memory capacity sufficient to store the samples of frequencies for each range gate and the Fo and Qo distribution values as determined by the number of range and frequency intervals and the desired false alarm rate.

Alternatively an analog-to-digital converter 28 (FIG. 5) with multiple digitizing channels and multiple outputs but no scanning or storing capacity may be utilized with a special purpose multiple input memory 30 capable of accepting all inputs at once. Memory 30 may consist of core memory units with input circuitry wired to allow multiple inputs and operation in a conventional manner well known in the art with computer 26.

In operation, the output of radar 18 is a doppler spectrum. This appears as signal outputs from the bank of filters 20. These outputs are labeled $X_{ij}$ where $i$ denotes a particular frequency interval and $j$ a particular range gate. By way of example, a two factor analysis of variance, if there are three frequency intervals and four range gates, results in the data table of FIG. 2A. An analysis of variance would be carried out as illustrated in FIG. 2B. The indicated quantities would be computed and then the ratio of column mean squares to residual mean square tested for significance by comparing it to stored values of F or variance ratio distribution.

Figure 5:
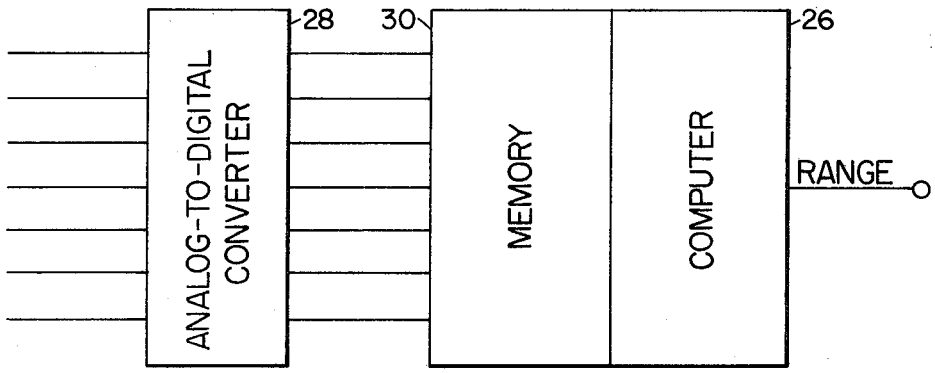

The information from the bank of filters 20 is converted to digital information and entered into the computer memory. The computer 26, of FIGS. 4 and 5 is programmed as illustrated in FIG. 6. In step (A) the total sums of squares, $S_T$, is obtained by summing range sums of squares, $S_c$, and frequency sums of squares, $S_r$, by performing the computation given in FIG. 2B. The error or residual sums of squares, $S_R$, is obtained in step (B) by subtracting $S_c$ and $S_r$ from $S_T$. The value, F, is computed as shown in step (C) where C = number of columns or ranges. In step (D) the value, F, is compared with the value, $F_o$. $F_o$ is a stored value determined by the number of range gates, frequency intervals (number of doppler filters) and the confidence level chosen (5%, 1%, 0.05%, etc.) which determines false alarm and detection probabilities. If F is less than $F_o$, the computations are terminated until new data is obtained from radar 20. If F is greater than or equal to $F_o$ an alarm signal will be generated and the computations continue to identify the range of the target. A value, $Q_o$, is computed in step (E) by utilizing a stored value $q_o$, which has been previously computed on the basis of the number of range gates, frequency intervals and the desired false alarm rate. A comparison is made in steps (F) and (G) between each range $\overline{X}$ and the average of the mean values of all other range values where K = 1 to C and goes from K = K to K = K + 1 (step (G)). If a particular range gate yields a value greater than $Q_o$, a target is indicated in that range interval and the range interval is decoded in step (H) in terms of yards and is fed to a display and tracking circuitry (not shown).

Obviously many modifications and variations of the present invention are possible in the light of the above teachings. It is therefore to be understood that within the scope of the appended claims the invention may be practiced otherwise than as specifically described.

What is claimed is:

1. The method of statistically detecting radar targets such as small ships in the presence of high sea state comprising the steps of:

producing statistical doppler spectrums of sea return signals reflected from the sea surface representing a sampling on a spatial basis where there is no target present, storing said statistical doppler spectrums in the memory unit of a computer programmed as a variance analyzer, processing active radar return signals from the surface of the sea to produce a plurality of doppler spectrums corresponding to different ranges from the radar, comparing the plurality of spectrums with said stored spectrums in the computer to determine if a target is present.

* * * * *